United States Patent [19]

Christenson

[11] Patent Number: 4,458,800

[45] Date of Patent: Jul. 10, 1984

[54] FOLDING CHUTE LINKAGE ASSEMBLIES

[75] Inventor: Ronald E. Christenson, Dodge Center, Minn.

[73] Assignee: McNeilus Truck & Manufacturing, Inc., Dodge Center, Minn.

[21] Appl. No.: 346,011

[22] Filed: Mar. 29, 1982

[51] Int. Cl.³ .............................................. B65G 11/00
[52] U.S. Cl. ...................................... 193/10; 74/105; 193/16
[58] Field of Search .................................. 193/4-6, 193/10, 14, 16, 2 A; 74/105, 106

[56] References Cited

U.S. PATENT DOCUMENTS

| | | | |
|---|---|---|---|
| 3,263,515 | 8/1966 | Adamski | 74/105 |
| 3,456,769 | 7/1969 | Prichard et al. | 193/4 |
| 3,774,741 | 11/1973 | Johnson | 193/10 |
| 3,930,567 | 1/1976 | Sims | 193/10 |
| 4,054,194 | 10/1977 | Davis | 193/10 |

Primary Examiner—Jeffrey V. Nase
Attorney, Agent, or Firm—Merchant, Gould, Smith, Edell, Welter & Schmidt

[57] ABSTRACT

The specification discloses linkage assemblies (16, 59) for effecting selective pivotal movement of hinged structures. The invention is particularly adapted for use with sectional chute assemblies of concrete mixers, either for moving adjacent chute sections between extended and retracted positions, or for swinging the entire chute assembly.

3 Claims, 8 Drawing Figures

FIG. 1
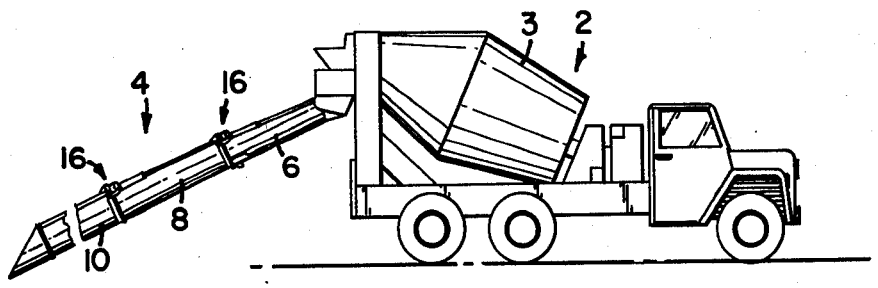
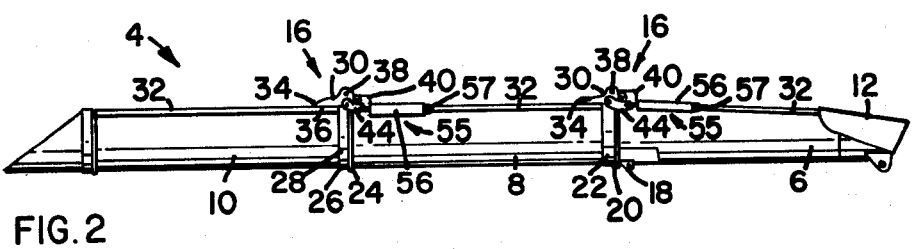
FIG. 2
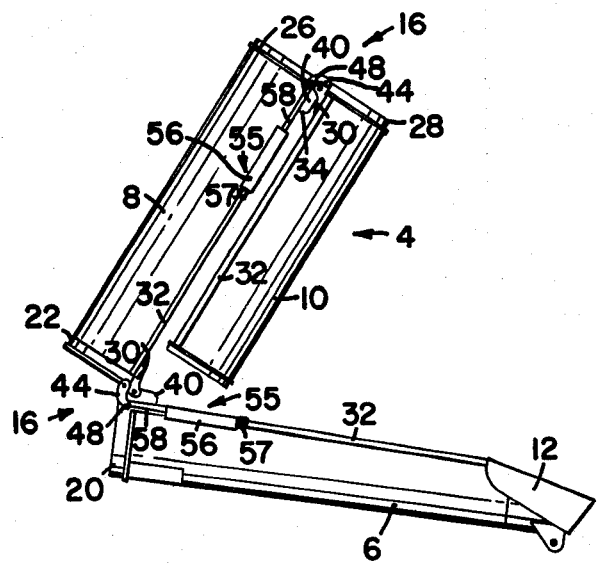
FIG. 3

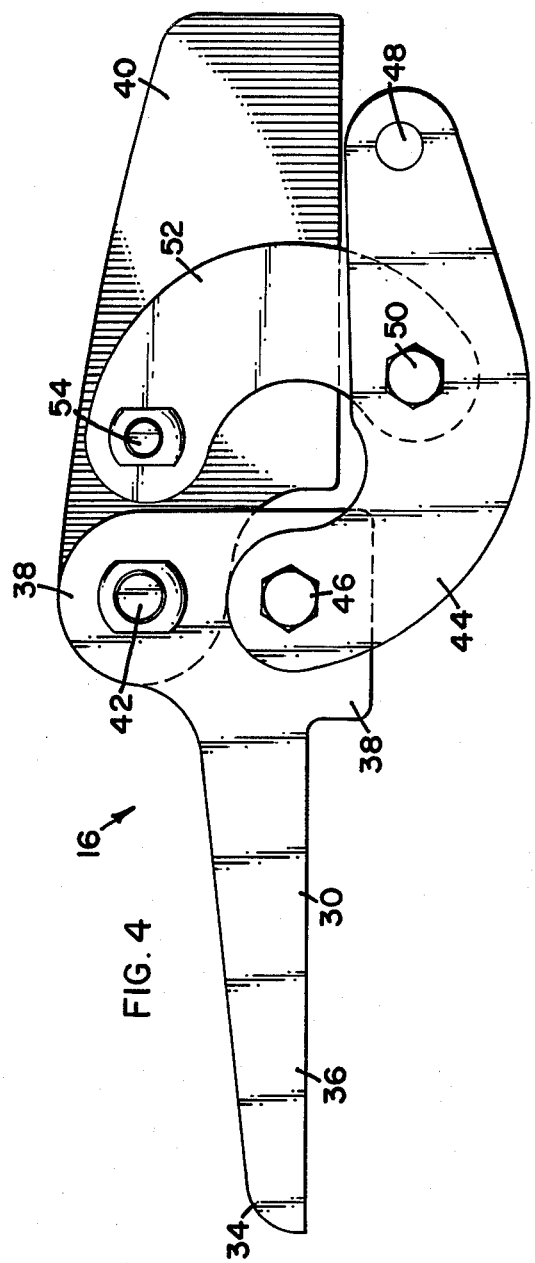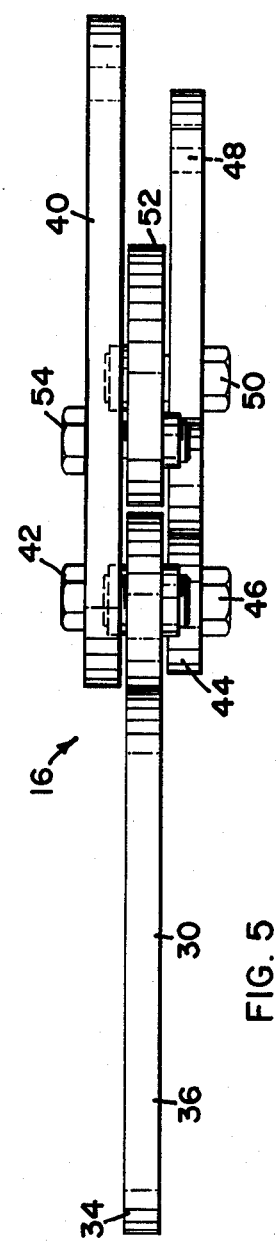

FOLDING CHUTE LINKAGE ASSEMBLIES

TECHNICAL FIELD

This invention relates generally to actuator mechanisms, and more particularly to compound linkage assemblies particularly suited for interconnecting sectional structures such as multiple chutes of a mixer, for example, for movement between retracted and extended positions, or for lateral swinging movement.

BACKGROUND OF THE INVENTION

Some transportable mixers, such as concrete mixers, typically employ a plurality of chute sections which are hinged together for movement between a retracted transport position and an extended discharge position. After transport to a site, the chute sections are extended to direct discharge of the concrete mix as desired. Manytimes the entire chute assembly is also mounted for pivotal movement over a lateral arc for further control over discharge of the mix.

Various assemblies have been utilized for retracting and extending such chutes between these positions. Devices representative of the prior art are shown in U.S. Pat. Nos. 3,774,741, 3,456,769, 3,930,567 and 4,054,194. The devices of these prior patents include a substantial number of parts in the actuator assemblies for positioning the hinged chute sections between such positions. It will be appreciated that such chutes are heavy, applying large stresses to such chute actuator assemblies. These actuator assemblies thus tend to wear out under rough handling and, due to their configurations, hardened cement tends to build up on the chute actuator assemblies of the prior art.

Certain prior actuator assemblies such as that disclosed in U.S. Pat. No. 3,456,769, employ hydraulic or pneumatic drive means for actuating movement of the chute sections between the retracted and discharge positions, but leave the piston rods exposed to damage in the extended discharge position such that the rods are exposed to hardened concrete. The hydraulic or pneumatic actuators of the prior art connect to a multiplicity of various devices for moving one chute relative to the other under the influence of the hydraulic or pneumatic piston actuator or to move the chute sections between the retracted and discharge positions.

Mechanical gear arrangements have also been suggested in the prior art, which are subject to the same disadvantages of the other type of actuators and connecting assemblies for pivoting the chute sections between said positions. Such gear arrangements, likewise, are subjected to similar wear and exposure to damage. In some cases, the terminal chute section is suggested in the prior art to be manually pivoted and nested with the next adjacent chute section.

It is also taught in the prior art that various means can be provided to pivot the entire chute about a generally vertical axis, either manually or mechanically, in order to facilitate discharge of the concrete within certain desired boundaries. The prior mechanisms employed for such positioning of the chute sections have also included a multiplicity of parts subject to the same disadvantages above noted with respect to retraction and extension of the chute sections.

There is thus a need for improved linkage assemblies for extension/retraction of the chute sections and for traversing the chute assembly about an upright axis, which affords better protection for the linkage and actuator thereof.

SUMMARY OF THE INVENTION

These disadvantages, among others of the prior art, are substantially overcome by means of the present invention, which includes mechanical linkage assemblies between chutes and which may be actuated by pneumatic or hydraulic cylinders to move the hinged chute sections between the retracted or folded position and the discharge position. The linkage of the present invention includes only four (4) links with one link being connected to one chute section; a second link being connected to the first link and adjacent chute section; and third and fourth links interconnecting to the first two links with the piston rod of a linear actuator which causes pivotal movement of the chute sections between the retracted and discharge positions.

In addition, in accordance with this invention, the piston rod of the actuator is in its retracted position when the chutes are in the discharge position; thus, minimizing possible damage to the piston rod while the concrete mix is flowing down the chute.

Moreover, in accordance with this invention, a modified linkage assembly employing the principles of the present invention can be utilized to swing the chutes from side-to-side within desired limits to facilitate spreading the concrete as desired.

Thus, in accordance with the present invention, the problems, difficulties and disadvantages of the prior art may be substantially overcome.

It is, therefore, an object of the present invention to provide new and improved discharge chute assemblies, including multiple hinged and pivotal chute sections, which may be located between a retracted position and a discharge position in a simple manner by means of the mechanisms herein.

Another object of the present invention is to provide a transportable chute assembly having hinged sections, which sections are selectively positionable in a retracted position or a discharge position.

Still another object of the present invention is to provide a transportable chute assembly having hinged sections pivotable from between retracted and discharge positions by means of the new and novel folding chute linkage assemblies.

A further object of the present invention is to provide a chute assembly, including hinged chute section linkage assemblies, including pivotal parts to move the adjacent sections from between retracted and discharge positions.

A still further object of the present invention is to provide folding chute linkage assemblies adapted to be pneumatically or hydraulically actuated to position adjacent chute sections by pivoting of the linkage assembly herein.

Another object of the present invention is to provide folding chute linkage assemblies for pivotally connecting adjacent chute sections, which linkage assemblies are pivotable between the retracted and discharge positions, including linkage assembly pivoting means connected to one of the pivotable linkage arms of the linkage assembly.

A still further object of the present invention is to provide the folding chute linkage assembly of the preceding object with hydraulic or pneumatic actuator means for effecting relative pivotal movement of said chute sections between the retracted and discharge positions.

Another object of the present invention is to provide a folding chute, including folding chute linkage assemblies, and hydraulically or pneumatically operated linkage assemblies between adjacent chute sections; wherein the actuator rods thereof are in their protected retracted positions when the chute sections are in the extended discharge position.

Still another object of the present invention is to provide new and novel linkage assemblies for pivoting a chute assembly from side-to-side, within limits, about an upright axis.

A further object of the present invention is to provide such a linkage assembly for pivoting the chute assembly about a vertical axis, including a pivotal linkage assembly.

Yet another object of the present invention is to provide a folding chute linkage assembly of the preceding objects, which is preferably hydraulically or pneumatically operated to cause pivoting of the linkage to place the adjacent chute sections in either the retracted position or the discharge position.

BRIEF DESCRIPTION OF THE DRAWING

These and other objects, features and advantages of the present invention will become readily apparent to one skilled in the art from a careful consideration of the following Detailed Description in conjunction with the accompanying Drawing, in which like reference numerals refer to like and corresponding elements throughout the several views; wherein:

FIG. 1 is a side view in elevation of a concrete mix vehicle, with an extendible chute utilizing the folding chute linkage assemblies of the present invention;

FIG. 2 is an enlarged side view in elevation of the chute assembly comprising a plurality of hinged chute sections incorporating the folding chute linkage assemblies of the present invention with the chute assembly in the discharge position;

FIG. 3 is a side elevation of the chute assembly of FIG. 2 showing the terminal chute section in a pivotally retracted position;

FIG. 4 is an enlarged side view in elevation of the folding chute linkage assembly constructed in accordance with the present invention;

FIG. 5 is a top view of the assembly of FIG. 4;

BRIEF DESCRIPTION OF PREFERRED EMBODIMENT OF THE INVENTION

Figure 6:
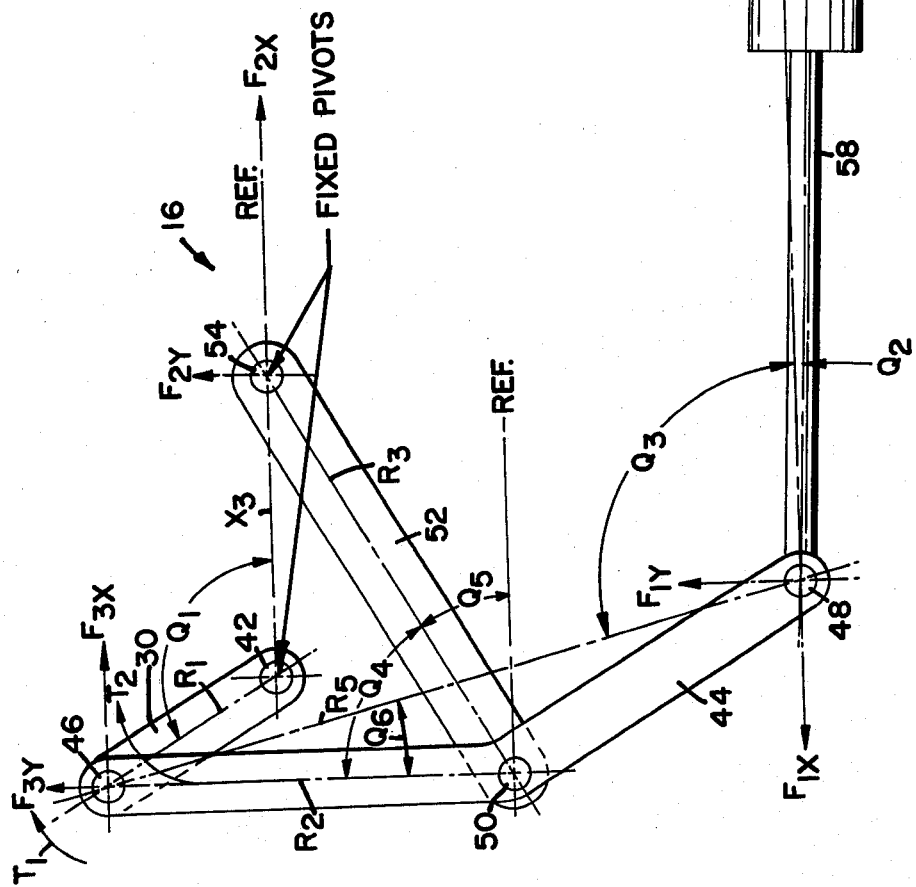
FIG. 6 is a kinematic diagram of the linkage arm of the linkage assembly of the present invention as driven by an actuator.

Referring to FIG. 1, there is illustrated by the numeral 2 a conventional concrete mix truck having conventional means for supporting from the truck a sectional discharge chute assembly 4 comprising a plurality of retractable or foldable chute sections 6, 8 and 10, the latter section 10 being the terminal discharge section of the chute assembly, with the chute sections being mountable, as aforesaid, to the truck 2. As will be explained more fully hereinafter, the sections of chute assembly 4 are interconnected by linkage assemblies 16 incorporating the invention for selective movement between extended and retracted positions. Although linkage assemblies 16 are particularly adapted for use with hinged sections of a concrete mix chute assembly, it will be appreciated that the linkage assemblies of the invention can be used with other types of hinged structures.

In FIG. 2, there is shown the chute assembly 4 in its discharge position with sections 6, 8 and 10 in extended position. The chute assembly 4 and each section thereof is generally semicircular in cross-section, or of a suitable concave cross-section to channel discharge of flowable concrete mix or the like from the drum 3 (FIG. 1), carried by the truck 2. A pair of linkage assemblies 16 are provided between each adjacent pair of chute sections.

FIG. 3 is illustrates the chute sections 8 and 10 in this preferred embodiment of the invention in a retracted or folded position for transport from one site to another.

Referring again to FIG. 2, it will be observed that the chute sections 6, 8 and 10 of the chute assembly 4, when in the extended discharge position, include, with respect to section 6, an end configuration 12 which defines a substantial receiving end for material deposited therein from the mixing drum 3 (FIG. 1).

Chute section 6, at its distal end 18, is provided with a configuration 20 for engagement with the corresponding adjacent proximal end 22 of the second chute section 8 to provide a surface continuity for flow of concrete mix between sections 6 and 8. Similarly, section 8, at its distal end 24, is provided with a configuration 26 to mate with the proximal end 28 of section 10, which in this embodiment is the terminal discharge section of the chute assembly 4 when in the discharge position shown in FIG. 2. Configurations 20 and 26 and ends 22 and 28 are complementary, and may take the form of overlapping pairs of flanges or lips, with the lip on the upstream chute section preferably overlying that on the adjacent downstream section as shown.

FIG. 3 illustrates one possible arrangement of sections 8 and 10 in their folded or retracted positions with respect to chute section 6 to facilitate transport of the chute assembly 4 on the truck 2 (FIG. 1). Of course, it will be appreciated that the sections 8 and 10, in accordance with the principles of the present invention, may be positioned at various vertical angles other than that illustrated in FIG. 3, depending upon the particular design constraints found acceptable within safety and other legal requirements, as is well known in the prior art.

Referring now to the folding chute linkage assembly 16 of the present invention, illustrated particularly in FIGS. 4 and 5, reference is made primarily to the two major linkage arms thereof which are intended for pivoting of chute sections 8 and 10 from between the retracted position of FIG. 3 and the extended discharge position of FIG. 2. A pair of folding chute linkage assemblies 16 of the present invention, in a simplistic form, are utilized to pivot chute 8 with respect to chute 6, and another pair are employed to pivot chute 10 with respect to chute 8, between the retracted position of FIG. 3 and the discharge position of FIG. 2.

It will be observed that the folding chute linkage assembly 16 of the present invention includes four major elements (FIGS. 2–5). These major parts include a bracket or first major arm 30, welded or otherwise secured to a flange or rib 32 which is preferably provided along each side of each chute section 8 and 10. In configuration, the first major arm 30 includes an elongated nose 34, a weldment section 36 and a body portion 38, as is best seen in FIGS. 3 and 4. The weldment portion 36 is secured to the flange 32.

The folding chute linkage 16 of the present invention also includes a second major arm 40, which is welded or otherwise secured to the next adjacent chute section. This second major arm 40 is pivotally secured by a bolt 42 to the first major arm 30, as clearly appears in FIGS. 4 and 5, for relative pivotal movement about a transverse axis defined by bolt 42 to permit movement of the interconnected chute sections between the retracted or folded position and the discharge or extended position. Arms 30 and 40, which preferably lie in generally vertical planes, thus define hinges by which adjacent chute sections are connected for relative pivotal movement.

A third arm or link 44 is pivotally secured at one end thereof to arm 30 by a bolt 46 (FIGS. 4 and 5), and is connectable at its other end 48 to suitable manual, pneumatic or hydraulic actuator means for pivoting the arm 30 and associated chute section from between the retracted or foldable position to the discharge position, or vice versa, about a pivot 50, depending upon the position of the cylinder rod of the actuator means; for example, of the folding chute linkage assembly 16, to be described in more detail hereinafter. The third arm 44 is preferably arcuate as shown to avoid interference with the other elements of linkage assembly 16 during operation.

A fourth arm or link 52 is provided between arms 40 and 44 to cause such movement between the retracted and extended positions. Arm 52 is pivotally connected, as clearly appears in FIGS. 4 and 5, at one end to the pivot 50 for movement with arm 44 in response to actuation thereof by the actuator assembly 55 of FIGS. 2 and 3. At its opposite end, the arm 52 is pivotally connected to the second major arm 40 by bolt 54 for pivotal movement in response to pivotal movement of arm 44 due to actuation by the actuator assembly 55, which applies a force to extend or retract and thereby pivot arm 44 about pivot 50 (FIG. 4) to move the adjacent chute section between the retracted position and the discharge position.

Arms 30, 40, 44 and 52 are generally flat and lie in planes which are generally perpendicular to the pivot axis defined by bolts 42.

Referring again to FIGS. 2 and 3, each actuator assembly 55 preferably comprises a double acting pneumatic or hydraulic cylinder arrangement of conventional construction, including a cylinder 56 coupled at one end by a pin 57 or other suitable pivotal connection to the chute section to which the second major arm 40 is secured. Extending from cylinder 56 is a piston rod 58 coupled at one end to the arm 44 as at 48. Actuator assemblies 55 are thus positioned outside chute 4 and alongside ribs 32 to minimize exposure to the concrete mix. The pneumatic or hydraulic actuator assembly 55 for folding chute linkage assembly 16 may be controlled in a conventional manner from inside the cab of the truck 2 by the operator thereof. In this regard, it will be noted that the piston rod 58 thereof is in an extended position, as shown in FIGS. 3 and 6, when the chute sections are in the retracted position. Conversely, the piston rod 58 is in a retracted position and therefore protected inside the cylinder 56 when the chute sections 6, 8 and 10 are in their discharge positions. Thus, possible damage to the piston rod 58 of each actuator assembly 55 is minimized because it is not extended when the chute sections are extended and concrete mix is flowing down the chute assembly 4.

Referring to FIG. 6, a kinematic diagram of the linkage assembly 16 is shown. In this illustration, when read in conjunction with the following summary of the torque and dimensional relationships of the linkage, it will be observed that various arm lengths and cylinder forces may be employed in accordance with the schematic representation of FIG. 6, depending upon the particular requirements of a given application, employing the principles of the present invention.

The following is a sample calculation explaining the diagram of FIG. 6. The geometric relationships are as follows:

$R_1$ = distance between pivots 46 and 42 = 1.25
$R_2$ = distance between pivots 50 and 46 = 2.25
$R_3$ = distance between pivots 54 and 50 = 2.375
$R_5$ = distance between pivots 48 and 46 = 4.0
$X_3$ = distance between pivots 54 and 42 = 1.375
$Q_6$ = 15°

The cylinder rear pivot 57 is located at (16, −3) from pivot 42.

Since torque on arm 30 = $T_2$ = Effective arm length × cylinder force, then
$T_2 = R_1 \times (F_{3x} \times \sin Q_1 - F_{3y} \times \cos Q_1)$ where cylinder force is 1.0.

$T_1 = R_5 \times \sin(Q_3 + Q_2)$ $F_{3x} = F_{2x} - F_{1x}$ $F_{3y} = F_{1y} + F_{2y}$ $F_{1x} = \cos Q_2$ $F_{1y} = \sin Q_2$ $F_{2x} = T_1 \times \cos Q_5 / R_2 / \sin Q_4$ $F_{2y} = T_1 \times \sin Q_5 / R_2 / \sin Q_4$ The dimensions of this particular linkage were chosen to give a desired torque curve. By changing these dimensions other torque curves can be obtained.

The ratio $R_5/R_1$ influences the torque most at $Q_1 = 80°$ and its effect tapers off at both extremes of $Q_1$.

The angle $Q_6$ influences the general shape of the torque curve. Reducing $Q_6$ lowers the center dip and 240° hump, but raises the curve at both extremes of $Q_1$. Increasing $Q_6$ has the opposite effect.

The ratio $R_2/R_1$ influences the 80° hump, but values different from $R_2/R_1 = 1.8$ will cause a severe drop at both extremes of $Q_1$.

The ratio $R_3/R_1$ influences the height of the curve between 60° and 260°, but values different from $R_3/R_1 = 1.9$ will cause a severe drop at both extremes of $Q_1$.

The ratio $X_3/R_1$ has the same effect as changing $R_3$ except decreasing $X_3$ increases curve height between 40° and 260°. Thus, various dimensionally related linkage torques can be employed to vary the pivotal range of the chute sections, particularly for transport purposes in accordance with the foregoing description.

Figure 8:
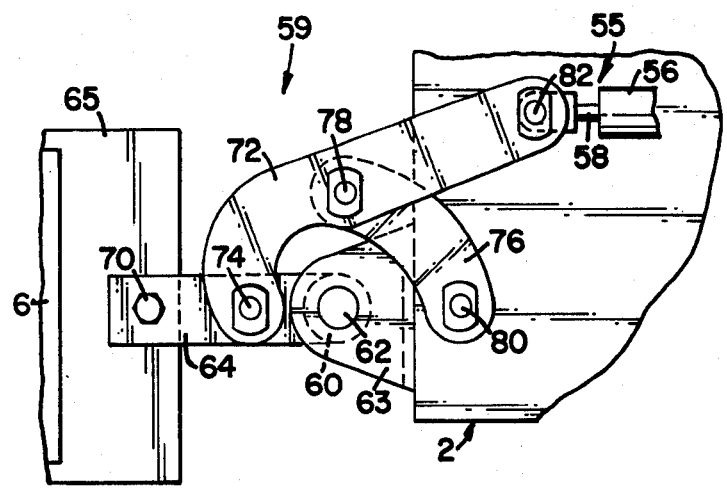
FIG. 8 is a top view of the assembly of FIG. 7.
Figure 7:
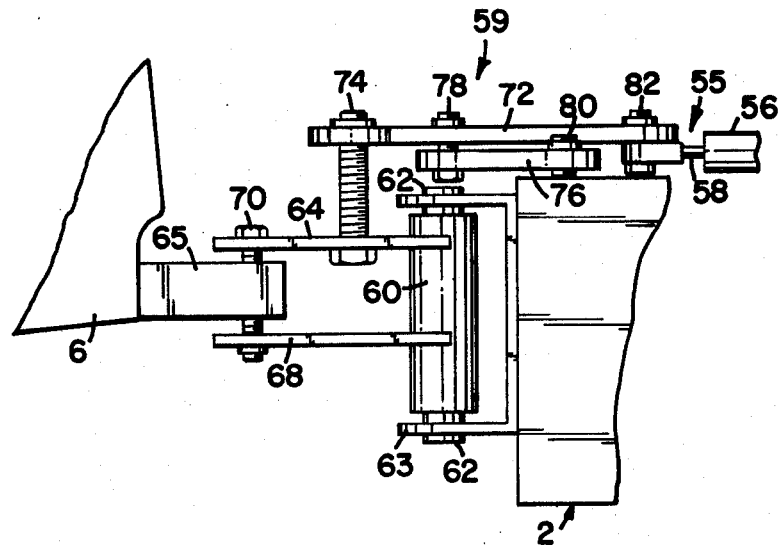
FIG. 7 is a side view of a linkage assembly, constructed in accordance with the principles of the present invention adapted to rotate the chute assembly about an upright axis from side-to-side.

Also, in accordance with the principles of the present invention, a linkage assembly 59 may be employed, as shown in FIGS. 7 and 8, for rotating the chute assembly 4 about a generally upright axis from side-to-side within limits to lay cement or other flowable material as desired.

FIGS. 7 and 8 show such a linkage assembly 59 including an upright pivot shaft 60 journaled between spaced bearings 62 supported by a bracket 63 secured to the body of vehicle 2. The pivot shaft 60 includes a pair of fixed spaced apart radial arms 64 and 68, shown secured together at one end by a bolt 70, for attachment of the shaft to the first chute section 6 as by connector bar or channel 65. Shaft 60 thus defines a generally upright axis about which chute assembly 4 can be pivoted relative to vehicle 2.

A linkage assembly arm 72 is pivoted to the bar 65 by bolt 74 for movement about a generally vertical axis. The arm 72 is connected to a second arm 76 of arcuate shape at pivot 78 with the other end of arm 76 being pivotable about pivot 80 in response to actuation of arm 72. Arm 72 includes an aperture 82 for connection to an actuator 55, which takes the form of a double acting cylinder 56 and piston rod 58 as shown, for controlling movement of the links 72 and 76 by the operator of the vehicle 2 from within the cab.

Thus, by actuation of the actuator 55 connected to arm 72, arm 72 swings about the pivot 78 in either direction, depending upon the stroke direction of the actuator, to move the chute assembly 4 in a horizontal plane within the limits defined by the various stroke and return positions of the actuator. Arm 76, during movement of the arm 72 and in response to movement of the actuator assembly 55, swings with the arm 72 about the pivot 78 connected to arm 74 and about the pivot 80 connected to the body of vehicle 2, to permit movement of the chute section 6 about the vertical pivot shaft 60 from side-to-side within those limits established by the truck operator controlling the actuator assembly 55. Assembly 59 may thus be employed between the chute assembly 4 and vehicle 2 to swing the entire chute assembly back and forth about an upright axis.

It will accordingly be understandable from the foregoing Detailed Description that new, improved and simplified means are provided for selectively positioning chute sections between the retracted or folded transportable position and the extended or discharge position. Means incorporating the principles of the present invention are also provided for causing movement of the chute assembly about an upright axis to permit either manual, pneumatic, or hydraulic operation, including such movement of the chute sections.

While these and other objects, features and advantages of the present invention will become readily apparent to one skilled in the art, it is understood that this invention is intended to embrace any alternatives, equivalents and/or modifications of elements falling within the scope of the following claims.

I claim:

1. A folding chute assembly for a concrete mix truck or the like, comprising:
   a downstream chute section; an upstream chute section located in end-to-end relationship with said downstream chute section;
   said upstream and downstream chute sections each being of generally semi-circular cross-section with adjacent ends thereof having overlapping complementary configurations for channeling flow of concrete mix;
   hinge means interconnecting said chute sections for pivotal movement about a generally transverse hinge axis between a retracted transport position and an extended discharge position;
   a first arcuate link having two ends, one end being pivoted to said downstream chute section at a point in predetermined spaced relationship with the transverse hinge axis;
   a double acting cylinder having two ends, one end being pivoted to the other end of said first link and the other end of said cylinder being pivoted to said upstream chute section, said cylinder being in a retracted protected position when said chute sections are in extended position; and
   a second arcuate link having two ends, one end being pivoted to said upstream chute section and the other end of said second link being pivoted to said first link at a point between the ends thereof.

2. A folding chute assembly for a concrete mix truck or the like, comprising:
   an upstream chute section;
   a downstream chute section;
   said upstream and downstream chute sections each being of generally a semi-circular cross-section with adjacent ends thereof having overlapping complementary configurations for channeling flow of concrete mix;
   a first arm ridgidly secured to said downstream chute section;
   a second arm ridgidly secured to said upstream chute section and extending adjacent a portion of said first arm on one side thereof;
   hinge means for pivotally interconnecting said first and second arms to define a generally transverse hinge axis about which said chute sections can pivot between a retracted transport position and an extended discharge position;
   a first arcuate link pivoted at one end to said first arm at a point in predetermined spaced relationship with the hinge axis, said first link being located on the other side of said first arm opposite said second arm;
   a double acting cylinder pivoted at one end to the other end of said first link, the other end of said cylinder being pivoted to said upstream chute section, said cylinder being in a retracted protected position when said chute sections are extended; and
   a second arcuate link positioned between said first link and first arm, and pivoted at one end to said second arm, the other arm of said second link being pivoted to said first link between the ends thereof.

3. A folding chute assembly for a concrete mix truck or the like, comprising:
   an upstream chute section;
   a downstream chute section;
   said upstream and downstream chute sections each being of generally a semi-circular cross-section with adjacent ends thereof having overlapping complementary configurations for channeling flow of concrete mix;
   a first arm ridgidly secured to said downstream chute section;
   a second arm ridgidly secured to said upstream chute section and extending adjacent a portion of said first arm on one side thereof;
   hinge means for pivotally interconnecting said first and second arms to define a generally transverse hinge axis about which said chute sections can pivot between a retracted transport position and an extended discharge position;

a first arcuate link pivoted at one end to said first arm at a point in predetermined spaced relationship with the hinge axis, said first link being located on the other side of said first arm opposite said second arm;

a double acting cylinder pivoted at one end to the other end of said first link, the other end of said cylinder being pivoted to said upstream chute section, said cylinder being in a retracted protected position when said chute sections are extended; and a second arcuate link positioned between said first link and first arm, and pivoted at one end to said second arm at a point in predetermined spaced relationship with the hinge axis, the other arm of said second link being pivoted to said first link between the ends thereof.

* * * * *

UNITED STATES PATENT AND TRADEMARK OFFICE
CERTIFICATE OF CORRECTION

PATENT NO. : 4,458,800
DATED : July 10, 1984
INVENTOR(S) : Ronald E. Christenson It is certified that error appears in the above-identified patent and that said Letters Patent are hereby corrected as shown below:

Column 1, line 19, "Manytimes" should be --Many times--;

Column 4, line 17, delete "is";

Column 8, line 26, "ridgidly" should be --rigidly--;

line 28, "ridgidly" should be --rigidly--;

line 48, "arm" (second occurrence) should be --end--;

line 59, "ridgidly" should be --rigidly--;

line 61, "ridgidly" should be --rigidly--;

Column 10, line 6, "arm" should be --end--.

Signed and Sealed this

Eighteenth Day of December 1984

[SEAL]

Attest:

GERALD J. MOSSINGHOFF

Attesting Officer  Commissioner of Patents and Trademarks